(12) United States Patent
Dietz et al.

(10) Patent No.: US 12,359,322 B2
(45) Date of Patent: Jul. 15, 2025

(54) METHODS AND APPARATUS FOR PRODUCTION OF ELECTROCHEMICAL GRAPHITE

(71) Applicant: CARBON HOLDINGS INTELLECTUAL PROPERTIES, LLC, Ranchester, WY (US)

(72) Inventors: James T. Dietz, Mars, PA (US); Robert McDowell, Sheridan, WY (US); Charles Agee Atkins, Sheridan, WY (US)

(73) Assignee: Carbon Holdings Intellectual Properties, LLC, Ranchester, WY (US)

( * ) Notice: Subject to any disclaimer, the term of this patent is extended or adjusted under 35 U.S.C. 154(b) by 26 days.

(21) Appl. No.: 18/132,269

(22) Filed: Apr. 7, 2023

(65) Prior Publication Data

US 2023/0265567 A1     Aug. 24, 2023

Related U.S. Application Data

(63) Continuation-in-part of application No. 17/705,241, filed on Mar. 25, 2022, now Pat. No. 11,680,326.
(Continued)

(51) Int. Cl.
| | |
|---|---|
| C25B 1/135 | (2021.01) |
| C01B 32/205 | (2017.01) |
| C01B 32/215 | (2017.01) |
| C10B 57/08 | (2006.01) |
| C25B 9/09 | (2021.01) |
| C25B 9/30 | (2021.01) |

(Continued)

(52) U.S. Cl.
CPC ............ *C25B 1/135* (2021.01); *C01B 32/205* (2017.08); *C01B 32/215* (2017.08); *C10B 57/08* (2013.01); *C25B 9/09* (2021.01); *C25B 9/305* (2021.01); *C25B 11/043* (2021.01); *C25B 15/083* (2021.01)

(58) Field of Classification Search
None
See application file for complete search history.

(56) References Cited

U.S. PATENT DOCUMENTS

| | | |
|---|---|---|
| 2015/0125604 A1 | 5/2015 | Botte |
| 2017/0050853 A1 | 2/2017 | Fray et al. |
| 2019/0194544 A1* | 6/2019 | Atkins ................ C08F 10/02 |

FOREIGN PATENT DOCUMENTS

WO    2022039589 A1    2/2022

OTHER PUBLICATIONS

International Search Report and Written Opinion for PCT Application No. PCT/US2022/022058, dated Jun. 22, 2022.
(Continued)

*Primary Examiner* — Wojciech Haske
(74) *Attorney, Agent, or Firm* — Dorsey & Whitney LLP

(57) ABSTRACT

A method of producing graphite may include beneficiating an amount of coal to form a coal char, grinding the coal char to produce a crushed char and placing the crushed char in a porous container. Then, the method includes immersing the porous container in a molten salt bath. The molten salt bath includes a graphite anode. The method further includes applying an electrical potential across the porous container and the graphite anode such that a graphite deposit forms on the graphite anode. The graphite anode is removed from the molten salt bath and the graphite deposit is separated from the graphite anode to produce graphite fragments.

20 Claims, 5 Drawing Sheets

Related U.S. Application Data

(60) Provisional application No. 63/166,869, filed on Mar. 26, 2021.

(51) Int. Cl.
*C25B 11/043* (2021.01)
*C25B 15/08* (2006.01)

(56) References Cited

OTHER PUBLICATIONS

Thapaliya et al. Molten Salt Assisted Low-Temperature Electro-Catalytic Graphitization of Coal Chars. Apr. 7, 2021, J. Electrochem. Soc. 168 046504.
Xing et al. (2018). Preparation of synthetic graphite from bituminous coal as anode materials for high performance lithium-ion batteries. Fuel Processing Technology. 172 162-171.
Jin, et al., (Chem. Eur. J. 2017, 23, 11455-11459) (Year: 2017).
Peng, et al., (Angew. Chem. Int. Ed. 2017, 56, 1751-1755) (Year: 2017).

* cited by examiner

METHODS AND APPARATUS FOR PRODUCTION OF ELECTROCHEMICAL GRAPHITE

CROSS-REFERENCE TO RELATED APPLICATION(S)

This application is a continuation-in-part of U.S. patent application Ser. No. 17/705,241 filed on Mar. 25, 2022, which claims priority to U.S. Patent Ser. No. 63/166,869 filed on Mar. 26, 2021, the disclosure of which is incorporated herein, in its entirety, by this reference.

BACKGROUND

Coal has been mined and used for a variety of purposes for thousands of years. Since the industrial revolution, the primary use for coal has been to generate heat and energy to power homes, industry, and transportation. Coal initially found widespread use as a transportation fuel for trains during the industrial revolution, but the advent of cars and the discovery of large petroleum deposits near the turn of the twentieth century precipitated a shift towards the primacy of liquid, petroleum-based fuels for transportation.

Research on coal continued, however, and the basic chemistry of coal was well understood by at least the early twentieth century. Although significant research has been conducted on coal liquefaction for more than a century, this extensive prior work has overwhelmingly been focused on the development of transportation fuels. The use of coal to produce other materials of greater industrial relevance has yet to be fully explored. For example, carbon-based technologies have come to the fore in recent years, with rapid developments being made in the commercialization of advanced carbon materials such as carbon fiber, graphene, graphite, and carbon nanotubes. As these advanced materials are increasingly used in mass produced, high volume applications, there is a need to quickly and economically supply large quantities of advanced carbon materials to manufacturers. Thus, while transportation fuels from coal are not viewed as a fruitful avenue for commercialization, there remains significant work to be done in developing processes to convert coal into the advanced carbon materials that will be instrumental in the economy of the future.

SUMMARY

A method of producing graphite includes beneficiating an amount of coal to form a coal char, grinding the coal char to produce a crushed char, placing the crushed char in a porous container, and immersing the porous container in a molten salt bath. The molten salt bath can include a graphite anode. The method may further include applying an electrical potential across the porous container and the graphite anode such that a graphite deposit forms in the porous container, removing the graphite anode from the molten salt bath, and separating the graphite deposit from the graphite anode to produce graphite fragments.

In some embodiments, beneficiating the amount of coal includes heating the amount of coal in an inert atmosphere to between about 600° C. and about 1000° C. to remove volatile components and impurities. Beneficiating the amount of coal may include heating the amount of coal in an indirectly heated rotary kiln. The crushed char may include a particle diameter of less than about 100 microns. The porous container may include a mesh including a metal having a high resistance to corrosion. In some embodiments, the porous container includes at least one of chromium, nickel, aluminum, tin, or alloy. The molten salt bath may include a calcium chloride or a magnesium chloride salt. In some embodiments, the electrical potential includes between about 2V to about 3V.

Separating the graphite deposit from the porous container may include a mechanical separation process. In some embodiments, the mechanical separation process may include rinsing the porous container with deionized or distilled water. The method of producing graphite may further include drying the graphite fragments. In some embodiments, the method of producing graphite may further include capturing volatile components of the coal while beneficiating the amount of coal and applying an electrical potential across the porous container and the graphite anode in the molten salt bath.

A method of producing graphite may include preparing a molten salt bath, adding a crushed coal char and a graphite rod to the molten salt bath, applying an electrical potential between the coal char and the graphite rod, and electrolyzing the molten salt to thermally reduce the coal char to produce an electrochemical graphite deposit. In some embodiments, preparing the molten salt bath includes heating a salt to 800° C. and electrolyzing the molten salt to form a reaction region.

Electrolyzing the molten salt may be continuously performed, in some embodiments. The graphite rod may include a series of graphite rods continuously supplied to reduce the coal char to continuously produce the electrochemical graphite deposit. In some embodiments, the electrical potential may be applied by coupling a conductive container including the coal char to a first wire conveyor and the graphite rod from a second wire conveyor, wherein the first wire conveyor and the second wire conveyor are suspended above the molten salt bath, coupling an electrical tension roller to the first wire conveyor and the second wire conveyor such that the coal char and the graphite rod suspend in the molten salt bath, and applying a voltage to the electrical tension roller such that the coal char is cathodic and the graphite rod is anodic, wherein carbon in the coal char transforms to graphite.

In some embodiments, the method of producing graphite may further include conveying the coal char and the graphite rod through at least a portion of the molten salt bath, removing the graphite rod and the conductive container from the molten salt bath, where the conductive container includes a graphite deposit. The method may further include separating the graphite deposit from the conducive container, and washing the graphite deposit with deionized or distilled water. In some embodiments, the method of producing graphite may further include processing the deionized or distilled water after washing the graphite deposit to capture and recycle salts.

An electrolytic apparatus to produce graphite may include a molten salt bath and an electrical source including a first wire conveyor and a second wire conveyor disposed above the molten salt bath, wherein the electrical source produces a voltage potential between the first wire conveyor and the second wire conveyor. The electrolytic apparatus may also include at least one coal char cathode suspended from the first wire conveyor and at least one graphite anode suspended from the second wire conveyor. The electrolytic apparatus may also include an electrical tension roller contact bus configured to couple to the first wire conveyor and the second wire conveyor. The electrical tension roller contact bus biases the at least one coal char cathode and at least one graphite anode to be suspended within the molten salt bath. The electrolytic apparatus may further include an electrolytic cell formed when the voltage is applied to the at least one coal char cathode and the at least one graphite anode to thermally reduce the coal char to produce an electrochemical graphite deposit. The graphite anode includes a series of graphite rods continuously supplied to reduce the at least one coal char cathode and to form a graphite deposit. In some embodiments, the molten salt bath includes a calcium chloride or a magnesium chloride salt heated to about 800° C. The electrical source may include a DC power supply including a voltage between about 2V and about 3V.

BRIEF DESCRIPTION OF THE DRAWINGS

The accompanying drawings illustrate various embodiments of the present apparatus and are a part of the specification. The illustrated embodiments are merely examples of the present apparatus and do not limit the scope thereof.

Throughout the drawings, identical reference numbers designate similar, but not necessarily identical, elements.

DETAILED DESCRIPTION

As described below, graphite may be produced from raw, mined coal. In some embodiments, the coal may be beneficiated to form a coal char that may then produce a graphite therefrom. High quality graphite may be produced at a relatively low temperature and low electrical energy using a molten salt process. This process may be scaled to a continuous and high-volume production of graphite.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Figure 1:
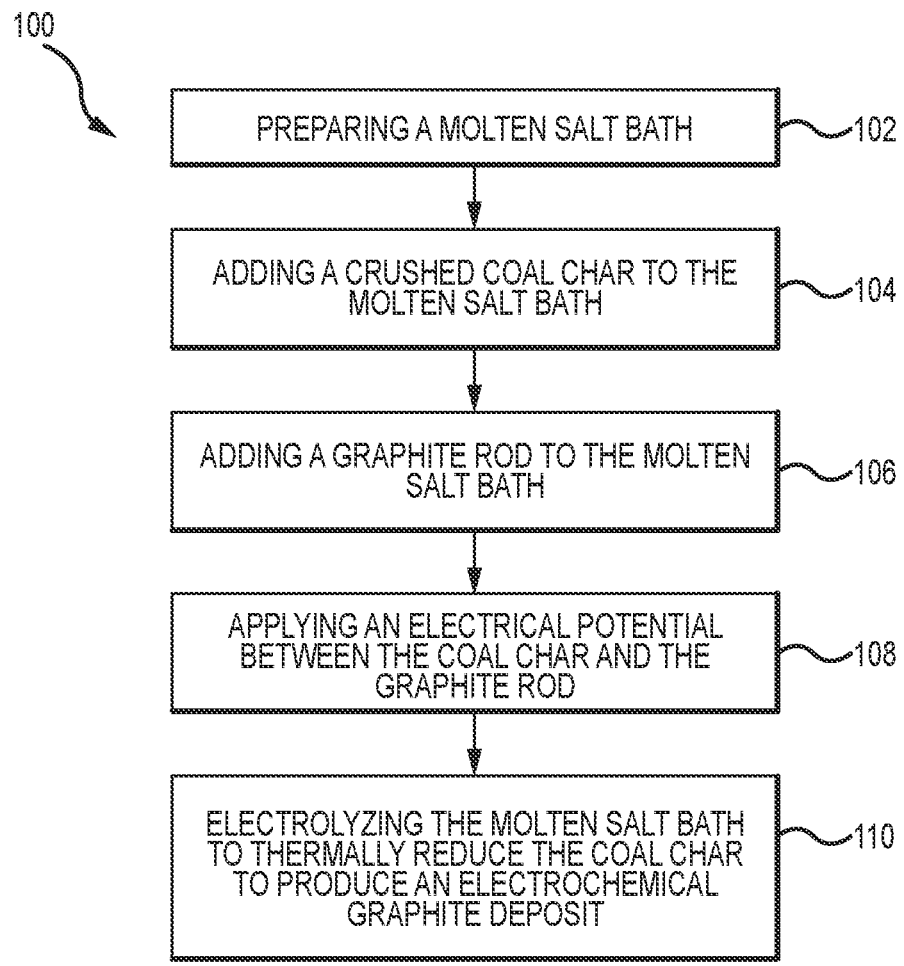
FIG. 1 illustrates a process flow diagram of an example of a method of producing graphite from coal, according to an embodiment.

According to some embodiments, and as illustrated in FIG. 1, a method of producing graphite 100 may include an act 102 of preparing a molten salt bath, an act 104 of adding a crushed coal char to the molten salt bath, and act 106 of adding a graphite rod to the molten salt bath, an act 108 of applying an electrical potential between the coal char and the graphite rod, and an act 110 of electrolyzing the molten salt to thermally reduce the coal char to produce an electrochemical graphite deposit. In some embodiments the act 102 of preparing a molten salt bath may include heating a salt to about 800° C. Molten salts have the advantage of very high liquid phase operating temperatures (700° C. or higher) with little or no vapor pressure. In some embodiments, the molten salt bath may include a calcium chloride or a magnesium chloride salt. For example, calcium chloride includes a melting temperature of 772° C. The molten salt bath may be heated my any suitable means. In some embodiments, the molten salt bath may be heated using natural gas or electrical burners. Where heating is by means of gas or oil firing, the combustion chamber of the bath may be lined with a suitable refractory. As the salt is heated may melt to form an electrolyte solution as the salt dissociates into ionic components.

Act 104 of the method of producing graphite 100 includes adding a crushed coal char to the molten salt bath. In some embodiments, the char may be crushed to increase the surface area of the coal char. In some embodiments, the coal char may be ground to less than 100 microns. In other embodiments, the coal char may be ground to less than 50 microns. In some embodiments, the crushed coal char may be screened. The coal char may be ground or crushed by any suitable means (e.g. jaw crusher, roller, immersion blender, etc.) Act 106 of the method of producing graphite 100 includes adding a graphite rod to the molten salt bath. The graphite rod may be an isomolded or extruded rod. In some embodiments, the graphite rod may include carbon graphite, electrographite, or resin-bonded graphite. The graphite rod may be any suitable shape. In some embodiments, the graphite rod may include a plate or slug.

Act 108 of the method of producing graphite 100 includes applying an electrical potential between the coal char and the graphite rod. The electrical potential may be a direct current (DC) applied potential. The electrical potential may be between 2-3 Volts, in some embodiments. An electrical current may be applied directly to the coal char and/or the graphite rod.

Figure 2:
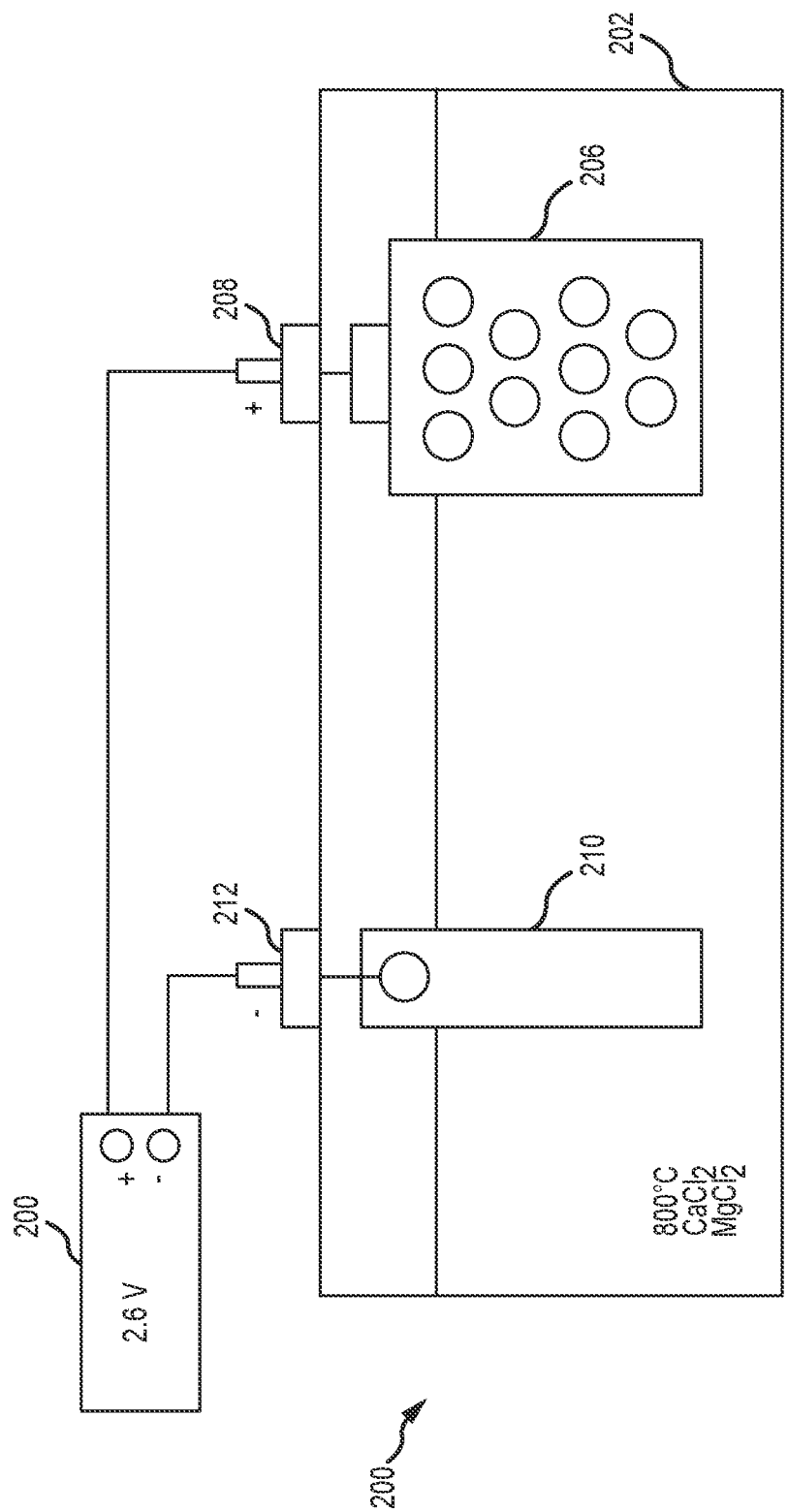
FIG. 2 illustrates an electrolytic cell, according to an embodiment.

As illustrated in FIG. 2, in some embodiments, an electrolytic cell 200 may be formed in a molten salt bath 202. As described above, the molten salt bath 202 may include a calcium chloride and/or magnesium chloride salt heated to about 800° C. The molten salt bath 202 may be electrolyzed to form a reaction region where a reduction and oxidation reaction may occur. An electrical source 204 may induce a current to the electrolytic cell 200. In some embodiments, the electrical source 204 may include a DC power supply. The DC power supply may include a voltage between about 2V to about 3V. For convention, a positive charge may be applied to the coal char 206 forming an anode 208 and the graphite rod 210 is a cathode 212. In some embodiments, the anode 208 undergoes a reduction reaction and the cathode 212 undergoes an oxidation reaction within the molten salt bath 202. A simple redox reaction may occur in which involves a change in the electrical charge of a charge carrier carbon ion, usually a simple or complex ion in the solution, by its taking away, an electron from the electrode (reduction), or its giving an electron to the electrode (oxidation). In some embodiments, the carbon ion is reduced and discharged as a neutral graphite species, which forms a graphite deposit as a flake. Thus, the carbon graphite may be deposited and collected. In some embodiments, the coal char 206 thus dissolves and forms the carbon ions. In some embodiments, during the redox reaction, volatile compounds may be released from the coal char 206. The volatile compounds may be collected.

Figure 3:
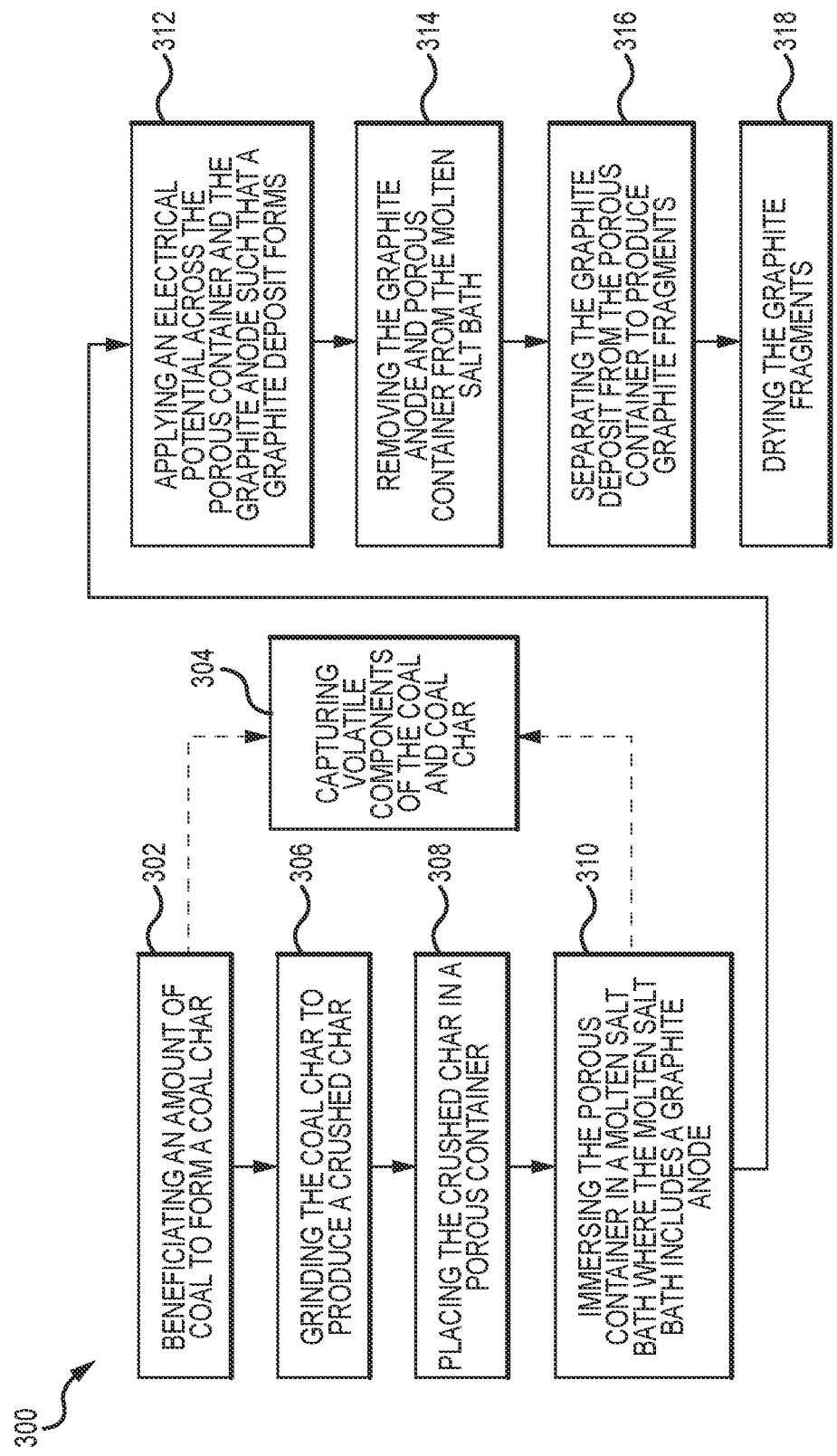
FIG. 3 illustrates a process flow diagram of an example of a method of producing graphite from coal including a beneficiating process, according to an embodiment.

As shown in FIG. 3, a method 300 of producing graphite may be scaled to include a continuous or semi-continuous process. In some embodiments, the method 300 may include an act 302 that includes beneficiating an amount of coal to form a coal char. Beneficiating the amount of coal may include heating an amount of coal to one or more temperatures for a desired duration. For example, beneficiation can include heating an amount of coal to between about 600° C. and about 1000° C. In some embodiments, this heating can be carried out at about atmospheric pressure. The heating may be carried out in an inert environment to minimize oxidation and/or limit subsequent reactions. In some embodiments, such a heating profile can remove a desired amount or range of amounts of moisture from the coal.

In some embodiments, during beneficiating, an act 304 of capturing volatiles may be included. In some embodiments, the coal utilized by the processes described herein can be lignite coal, and can have a volatile content of greater than about 45 wt. %. In some embodiments, the coal can be sub-bituminous coal, bituminous coal, and/or anthracite coal. In some embodiments, the raw coal can be beneficiated to remove contaminants or impurities such as water and/or heavy metals. In some embodiments, beneficiating the coal can produce various other products that can be captured and used in later processing steps, that can be valuable in and of themselves, or that can be subjected to further processing or use in the method 300. That is, in some embodiments, beneficiating the coal can produce or separate gases or liquids from the raw coal. These gases and/or liquids can be captured or separated during processing. For example, beneficiating the coal at act 302 can produce H2, CO2, CO, CH4, C2H4, C3H6, and/or other hydrocarbon gases, which can be captured and subsequently utilized in act 304 or in other process steps. In some cases, beneficiating the coal can result in liquids such as C2, C3, and/or C4 hydrocarbons, toluene, and/or benzene, which can be captured for subsequent use or processing.

In some cases, beneficiation can include heating an amount of coal to one or more temperatures for a desired duration. In some other embodiments, the coal can be beneficiated by heating the coal to a desired temperature in the presence of one or more catalyst compounds. In some cases, beneficiating the coal can include pyrolyzing the coal, for example in the presence of a catalyst. In some embodiments, beneficiation may include heating the amount of coal in an indirectly heated rotary kiln. The kiln may be heated by natural gas or electrical heat. In some embodiments, the rotary kiln may be heated to a temperature between about 600° C. to about 1000° C.

The method 300 may include an act 306 that includes grinding the coal char to produce a crushed char. In some embodiments, the char may be crushed to increase the surface area of the coal char. In some embodiments, the coal char may be ground to less than 100 microns. In other embodiments, the coal char may be ground to less than 50 microns. In some embodiments, the coal char may be ground to about 350 mesh or less. In some embodiments, the crushed coal char may be screened. The coal char may be ground or crushed by any suitable means (e.g. jaw crusher, roller, immersion blender, etc.).

The method 300 may include an act 308 that includes placing the crushed char in a porous container. In some embodiments, the porous container includes a mesh metal container. The mesh metal container may include a metal having a high resistance to corrosion. In some embodiments, the porous container may include at least one of a passive metal. The porous container may include at least one of chromium, nickel, aluminum, tin, or a passive alloy. The porous container may be any suitable container that may be resistant to molten salt and/or high temperature conditions and include pores and/or apertures.

The method 300 may include an act 310 that includes immersing the porous container in a molten salt bath. In some embodiments, the molten salt bath includes a calcium chloride salt. In other embodiments, the molten salt bath may include a magnesium chloride salt. Any suitable salt or combination of salts may be included. The molten salt may be heated to about 800° C. in some embodiments. The molten salt bath may include a graphite anode. In some embodiments, the graphite anode may include an incomparable balance of relatively low cost, abundance, high energy density, power density, and very long cycle life. Further, Graphite anodes meet the voltage requirements of the crushed char as a cathode and is porous and durable.

The method 300 may include an act 312 that includes applying an electrical potential across the porous container and the graphite anode such that a graphite deposit forms from the char. The mechanism for the deposit is describe above in reference to FIG. 2. In some embodiments, the electrical potential may include between about 2V and about 3V. The electrical potential may be produced by a direct current (DC) power supply. The DC power supply may supply a constant DC voltage to the porous container and the graphite anode. In some embodiments, the pours container includes the crushed char within that acts as the cathode. The electrical potential between the anode and the cathode cause the carbon ions of the coal char to transform into graphite. The form of carbon transformed is graphite and/or layers of graphite flakes or fragments. In some embodiments, volatile compounds from the coal char may be released during electrolysis. The volatile compounds may be captured as act 304 similar to those that are captured during act 302 of beneficiating the amount of coal. The volatile compounds may be processed to produce gas and/or liquid coal products. In some embodiments, the volatiles may be recycled or used to produce heat and/or electrical power.

In some embodiments, the act 312 of applying an electrical potential across the porous container and the graphite anode may be continuously performed. In such a continuous process, electrolyzing the molten salt may be continuous. The graphite anode or graphite rod may include a series of graphite rods continuously supplied to reduce the coal char to continuously produce the graphite deposit on the graphite anode. As a continuous process, the electrical potential may be applied by coupling the porous container including the coal char to a first wire conveyor and the graphite collector rod from a second wire conveyor. In some embodiments, the first wire conveyor and the second wire conveyor are suspended above the molten salt bath. The act 312 may further include coupling an electrical tension roller to the first wire conveyor and the second wire conveyor such that the coal char and the graphite collector rod suspend in the molten salt bath. Then a voltage may be applied to the electrical tension roller such that the coal char is cathodic and the graphite collector rod is anodic. Carbon then converts to graphite. In some embodiments, the coal char and the graphite rod may be conveyed through at least a portion of the molten salt bath. In some embodiments, the first wire conveyor and the second wire conveyor are coupled to a system that passes the coal char and the graphite collector rod through the molten salt bath in a counter current direction. For example, the porous container including the coal char may be conveyed through the molten salt bath in a first direction from a first end of the bath to a second end of the bath where the coal char is then removed from the molten salt bath. The graphite rod(s) are conveyed through the molten salt bath in a second direction opposite the first direction from the second end of the bath to the first end of the bath where the graphite rod(s) are then removed from the molten salt bath.

The method 300 may include an act 314 that includes removing the graphite anode from the molten salt bath. In act 314, the graphite anode includes graphite deposit. In some embodiments, the graphite anode further includes salt deposits from the molten salt bath. On each side of the bath, the char container or graphite rod leaves the bath to be recovered and/or recycled. The graphite anode rods are moved slowly, based on the rate of deterioration of the rods in the salt bath. As the graphite anode is removed from the molten salt, the graphite anode may be cooled below the freezing temperature of the salt. In some embodiments, the graphite anode can be air cooled by either contact with air or by convection. In other embodiments, the graphite anode may be cooled in an inert atmosphere. The graphite anode may be further cooled by washing with a deionized and/or distilled water. The deionized and/or distilled water may be sprayed on the graphite anode or may be a separate cooling bath that the graphite anode may be dipped in. The salt may be removed from the graphite anode and collected and/or reprocessed and recycled for use in the molten salt bath of act 310. The reprocess and/or recycling of the salt may be performed by any suitable means. In some embodiments, the deionized and/or distilled water may be processed in a reverse osmosis system. In other embodiments, the salt may be concentrated, dried, or distilled from the water that was used to wash the graphite anode.

The method 300 may include an act 316 that includes removing the graphite deposit from the container to produce graphite fragments. In some embodiments, the separating includes a mechanical separation process. The graphite fragments of act 316 may be scraped off and collected robotically, as the container is at a high temperature. In some embodiments, the container can be cooled through an enclosed conveyor portion that cools the container and the graphite deposit therein. In some embodiments, the container may be vibrated and/or impacted to remove the graphite fragments. In other embodiments, any suitable mechanical or chemical separation process may remove the graphite deposit. In some embodiments, the mechanical separation process includes washing and/or rinsing the container with deionized or distilled water. The deionized and/or distilled water may be sprayed on the container or may be a separate bath that the container may be dipped in. In some examples, the graphite can form on other parts of the system. For example, the graphite fragments can be collected from the graphite anode rods or can be free floating in the salt bath. The graphite can be collected with a mechanical filter from the salt bath and scraped off of the graphite rods. In some examples, the salt bath can be cooled and the graphite can be collected from the surface of the bath. In some examples, the process can be shut down to cool the bath and collect the graphite from the surface when a predetermined amount of graphite is collected at the surface. For example, when a predetermined thickness (e.g., 1 cm) of graphite layer is collected at the surface of the bath.

The method 300 may include an act 318 that includes drying the graphite fragments. The graphite fragments may be dried by any suitable method. In some embodiments, the graphite fragments may be dried in a rotary kiln, an oven, forced air, or allowed to dry at ambient temperature. In some embodiments, the graphite fragments may then be check for quality control and packaged for distribution.

Figure 4A:
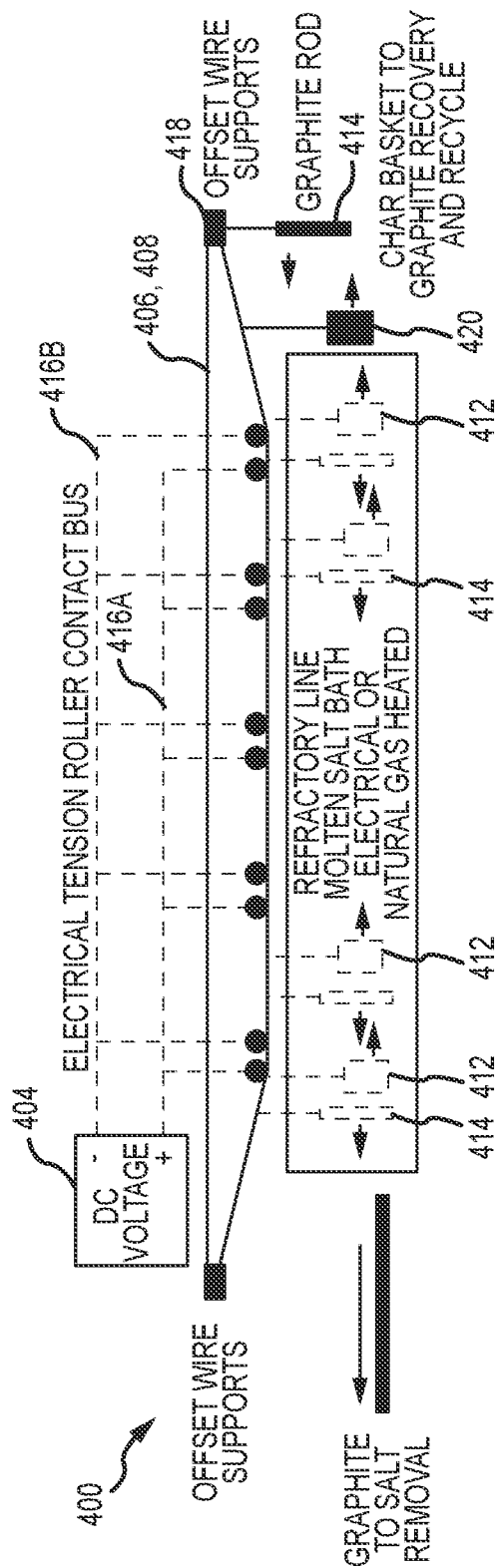
FIG. 4A illustrates a side schematic view of a system to produce graphite, according to an embodiment.
Figure 4B:
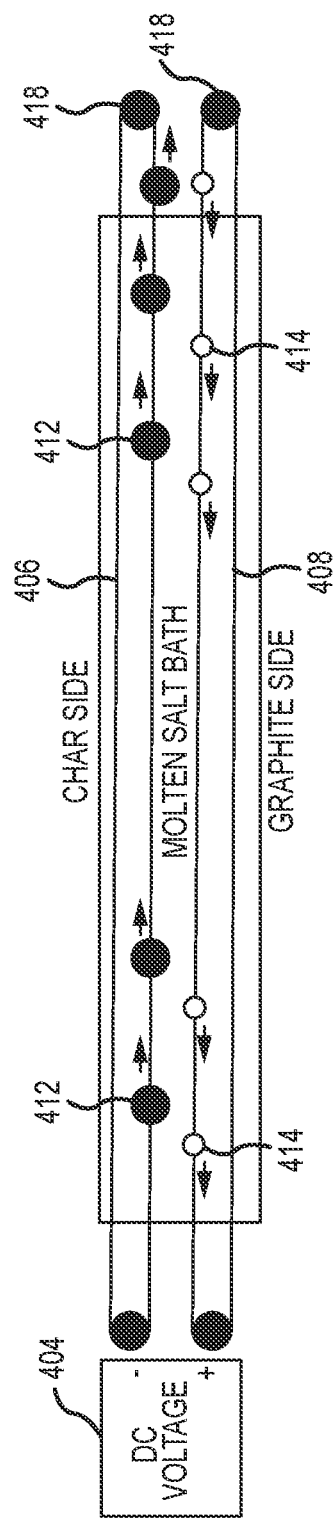
FIG. 4B illustrates a top schematic view of a system to produce graphite, according to an embodiment.

Referring now to FIGS. 4A-4B, an electrolytic apparatus 400 to produce graphite in a continuous manner is illustrated. In some embodiments, the electrolytic apparatus 400 may include a molten salt bath 402. In some embodiments, the molten salt bath 402 may be electrical and/or natural gas heated. In some embodiments, the molten salt bath 402 may be heated to about 800° C. The molten salt bath 402 may be refractory lined. In some embodiments the molten salt bath 402 may be lined with high-alumina refractory. In other embodiments, the refractory may be produced from any suitable natural and/or synthetic material or combination of compounds such as alumina, fireclays, bauxite, chromite, dolomite, magnesite, silicon carbide, etc. As described above, the molten salt bath may include a calcium chloride, magnesium chloride, or other salt or combination of suitable salts.

The electrolytic apparatus 400 may further include an electrical source 404. The electrical source 404 may include a DC power source capable of producing a voltage (V) between about 1 volt and about 10 volts. The electrical source may include any suitable power source capable of maintaining a constant DC voltage. In some embodiments, the electrical source 404 may include a first wire conveyor 406 and a second wire conveyor 408 disposed above the molten salt bath 402. The electrical source 404 may be configured to produce a voltage potential between the first wire conveyor 406 and the second wire conveyor 408. In some embodiments, the voltage potential between the first wire conveyor 406 and the second wire conveyor 408 may be between about 2V and about 3V.

The electrolytic apparatus 400 may further include at least one coal char cathode 410 suspended from the first wire conveyor 406. In some embodiments, the coal char cathode 410 may include a char basket 412. The char basket 412 may be configured to hold a crushed coal char. The crushed coal char may include the at least one coal char cathode 410. The char basket 412 may include a mesh metal container. The char basket 412 may include a metal having a high resistance to corrosion. In some embodiments, the char basket 412 may include at least one of a passive metal. The char basket 412 may include at least one of chromium, nickel, aluminum, tin, or a passive alloy. The char basket 412 may be any suitable container that may be resistant to molten salt and/or high temperature conditions and include pores and/or apertures.

The electrolytic apparatus 400 may further include at least one graphite anode 414 suspended from the second wire conveyor 408. In some embodiments, the graphite anode 414 may be any suitable graphite body. The graphite anode 414 may be an isomolded or extruded rod. In some embodiments, the graphite anode 414 may include carbon graphite, electrographite, or resin-bonded graphite. The graphite anode 414 may be any suitable shape. In some embodiments, the graphite anode 414 may be a graphite rod, a plate, or a slug.

The electrolytic apparatus 400 may further include an electrical tension roller contact bus 416. The electrical tension roller contact bus 416 may be configured to couple to the first wire conveyor 406 and the second wire conveyor 408. The electrical tension roller contact bus 416 may include a cathode portion 416A and an anode portion 416B. The cathode portion 416A may be configured to contact the first wire conveyor 406 and the anode portion 416B may be configured to contact the second wire conveyor 408. In some embodiments, the electrical tension roller contact bus 416 may bias the at least one coal char cathode 410 and the at least one graphite anode 414 to be suspended within the molten salt bath 402. In some embodiments, the first wire conveyor 406 and the second wire conveyor 408 are supported by above the molten salt bath 402 by offset wire supports 418. The offset wire supports 418 may maintain tension in the first wire conveyor 406 and the second wire conveyor 408. The offset wire supports 418 may further include a motor and/or be coupled to an external motor (not shown) to rotate the first wire conveyor 406 and the second wire conveyor 408 continuously or periodically.

Thus, the electrolytic apparatus 400 forms an electrolytic cell to produce graphite through an oxidation reaction on the graphite anode 414. In some embodiments and electrolytic cell is formed continuously as the voltage is applied to the at least one coal char cathode 410 and the at least one graphite anode 414. The electrolytic cell may be configured to thermally reduce the coal char cathode 410 to produce an electrochemical graphite deposit 420 from the coal char. As shown in FIGS. 4-5, the at least one graphite anode 414 may include a series of graphite rods continuously supplied to reduce the at least one coal char cathode 410 and form the graphite deposit 420 in the char basket 412. In some embodiments, the graphite deposit 420 may be removed from the char basket 412 by having the second wire conveyor 408 contact an electrically isolated mechanical blade or edge. In some embodiments, the graphite deposit 420 may collect under the mechanical blade. In some embodiments, the char basket 412 may be filled with sufficient coal char to minimize removal and handling of the char basket 412 from the molten salt bath 402.

In some embodiments, once the graphite deposit 420 is separated from the char basket 412, the graphite deposit 420 may be cooled by conveying the graphite deposit 420 in air or in an inert environment and then may be washed with deionized and/or distilled water. In some embodiments, the washing may remove residual salts from the graphite deposit 420. The cooled and washed graphite deposit 420 may then be dried by any suitable means, inspected for quality control, and packed as described above. In some embodiments, the rinse water is sent to a recovery system for recycling the solid salt and make it available for reuse in the molten salt bath 402. The deionized and/or distilled water may be processed in a reverse osmosis system to recover the salts.

Unless otherwise indicated, all numbers or expressions, such as those expressing dimensions, physical characteristics, etc., used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

In addition, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The invention claimed is:

1. A method of producing graphite, comprising:
beneficiating an amount of coal to form a coal char;
grinding the coal char to produce a crushed char;
placing the crushed char in a porous container;
immersing the porous container in a molten salt bath, wherein the molten salt bath includes a graphite anode, wherein the graphite anode includes a series of graphite rods continuously supplied to reduce the coal char;
applying an electrical potential across the porous container and the graphite anode such that a graphite deposit forms in the porous container, wherein applying the electrical potential across the porous container and the graphite anode is continuously performed to continuously form the graphite deposit;
removing the graphite anode and the porous container from the molten salt bath; and
separating the graphite deposit from the porous container to produce graphite fragments.

2. The method of claim 1, wherein beneficiating the amount of coal comprises heating the amount of coal in an inert atmosphere to between about 600° C. and about 1000° C.

3. The method of claim 2, wherein beneficiating the amount of coal comprises heating the amount of coal in an indirectly heated rotary kiln.

4. The method of claim 1, wherein the crushed char comprises a particle diameter of less than about 100 microns.

5. The method of claim 1, wherein the porous container comprises a mesh comprising a metal having a high resistance to corrosion.

6. The method of claim 5, wherein the porous container comprises at least one of chromium, nickel, aluminum, tin, or alloy.

7. The method of claim 1, wherein the molten salt bath comprises a calcium chloride or a magnesium chloride salt.

8. The method of claim 1, wherein the electrical potential comprises between about 2V to about 3V.

9. The method of claim 1, wherein separating the graphite deposit from the porous container comprises a mechanical separation process.

10. The method of claim 9, wherein the mechanical separation process comprises rinsing the porous container with deionized or distilled water.

11. The method of claim 1, further comprising collecting the graphite deposit from the salt bath and drying the graphite fragments.

12. The method of claim 1, further comprising capturing volatile components of the coal while beneficiating the amount of coal and applying an electrical potential across the porous container and the graphite anode in the molten salt bath.

13. A method of producing graphite, comprising:
preparing a molten salt bath;
adding a crushed coal char and a graphite rod to the molten salt bath;
applying an electrical potential between the coal char and the graphite rod; and
electrolyzing the molten salt bath to thermally reduce the coal char to produce an electrochemical graphite deposit, wherein electrolyzing the molten salt is continuously performed, and the graphite rod includes a series of graphite rods continuously supplied to reduce the coal char to continuously produce the electrochemical graphite deposit.

14. The method of claim 13, wherein preparing the molten salt bath comprises heating a salt to 800° C. and electrolyzing the molten salt to form a reaction region.

15. The method of claim 13, wherein the electrical potential is applied by:
coupling a conductive container including the coal char to a first wire conveyor and the graphite collector rod from a second wire conveyor, wherein the first wire conveyor and the second wire conveyor are suspended above the molten salt bath;
coupling an electrical tension roller to the first wire conveyor and the second wire conveyor such that the coal char and the graphite collector rod suspend in the molten salt bath;
applying a voltage to the electrical tension roller such that the coal char is cathodic and the graphite collector rod is anodic, wherein carbon in the coal char converts to graphite.

16. The method of claim 13, further comprising:
conveying the coal char and the graphite collector rod through at least a portion of the molten salt bath;
removing the graphite collector rod and the conductive container from the molten salt bath, wherein the conductive container includes a graphite deposit;
separating the graphite deposit from the conductive container; and
washing the graphite deposit with deionized or distilled water.

17. The method of claim 16, further comprising processing the deionized or distilled water after washing the graphite deposit to capture and recycle salts.

18. An electrolytic apparatus to produce graphite, comprising:
a molten salt bath;
an electrical source including a first wire conveyor and a second wire conveyor disposed above the molten salt bath, wherein the electrical source produces a voltage potential between the first wire conveyor and the second wire conveyor;
at least one coal char cathode suspended from the first wire conveyor;
at least one graphite anode suspended from the second wire conveyor;
an electrical tension roller contact bus configured to couple to the first wire conveyor and the second wire conveyor, wherein the electrical tension roller contact bus biases the at least one coal char cathode and at least one graphite anode to be suspended within the molten salt bath; and
an electrolytic cell formed when the voltage is applied to the at least one coal char cathode and the at least one graphite anode to thermally reduce the coal char to produce an electrochemical graphite deposit, wherein electrolyzing the molten salt is continuously performed and wherein the at least one graphite anode includes a series of graphite rods continuously supplied to reduce the at least one coal char cathode and form a graphite deposit from the coal char cathode.

19. The electrolytic apparatus of claim 18, wherein the molten salt bath includes a calcium chloride or a magnesium chloride salt heated to about 800° C.

20. The electrolytic apparatus of claim 18, wherein the electrical source includes a DC power supply including a voltage between about 2V and about 3V.

* * * * *